Nov. 11, 1924.
W. B. PIERSON
DISHWASHING MACHINE
Filed May 22, 1922      2 Sheets-Sheet 1
1,515,407
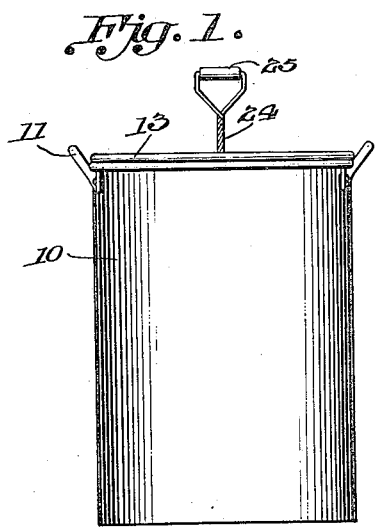
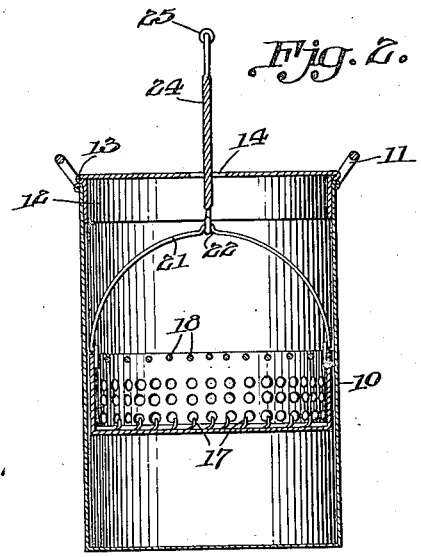
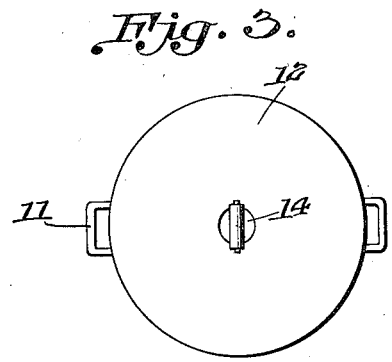
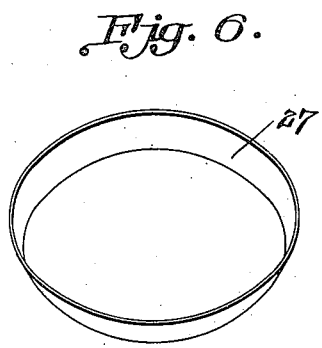
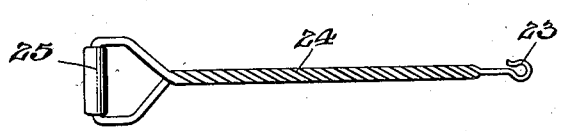
W. B. Pierson
INVENTOR
BY Victor J. Evans
ATTORNEY
WITNESS:

Nov. 11, 1924.
W. B. PIERSON
1,515,407
DISHWASHING MACHINE
Filed May 22, 1922　　2 Sheets-Sheet 2
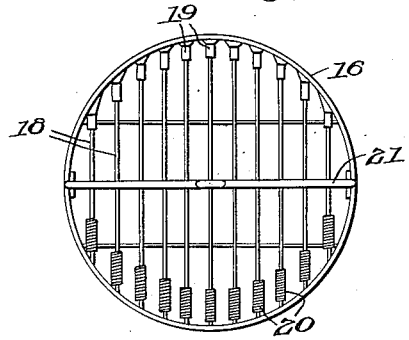
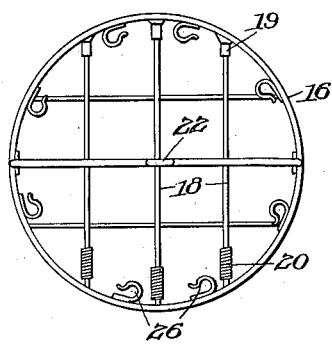
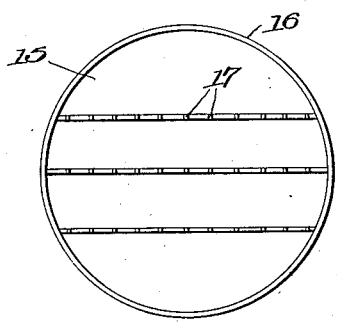
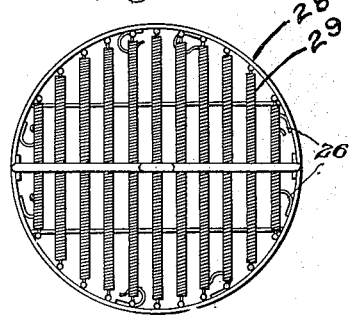
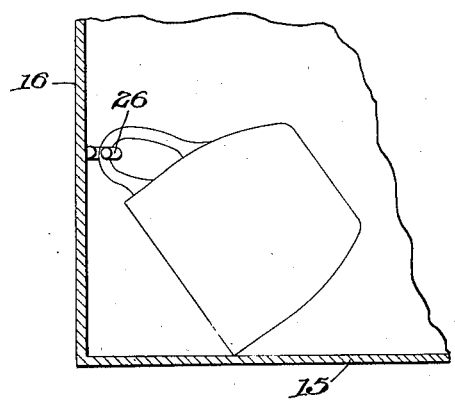
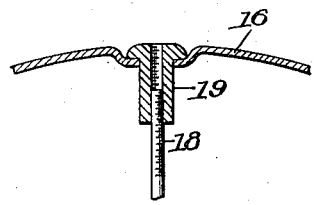
W. B. Pierson
INVENTOR
BY Victor J. Evans
ATTORNEY
WITNESS:

Patented Nov. 11, 1924.

1,515,407

UNITED STATES PATENT OFFICE.

WALTER B. PIERSON, OF SECTION 5-6, TOWN 8, RANGE 13, ILLINOIS.

DISHWASHING MACHINE.

Application filed May 22, 1922. Serial No. 562,776.

*To all whom it may concern:*

Be it known that I, WALTER B. PIERSON, a citizen of the United States, residing at Section 5-6, Town 8, Range 13, in the county of Greene and State of Illinois, have invented new and useful Improvements in Dishwashing Machines, of which the following is a specification.

This invention relates to kitchen apparatus and has for its object the provision of a novel manually operated device by means of which dishes of all kinds may be quickly and easily washed, thus saving time and labor as compared with the ordinary hand washing methods.

An important object is the provision of a device of this character which includes novel adjustable racks for holding shallow plates, saucers and the like and other racks for holding deeper dishes and cups.

An additional object is the provision of a device of this character which will be simple and inexpensive to manufacture, efficient and durable in use and a general improvement in the art.

With the above and other objects and advantages in view the invention consists in the details of construction to be hereinafter more fully described and claimed and illustrated in the accompanying drawings, in which:

Figure 1 is a side elevation of the tank having a rack disposed therein,

Figure 2 is a longitudinal section,

Figure 3 is a plan view,

Figure 4 is a horizontal section showing a plan view of the rack for shallow dishes, Figure 5 is a detail view of the handle, Figure 6 is a perspective view of a tray, Figure 7 is a plan view of the rack for deep dishes and cups, Figure 8 is a detail view showing the cup hanger mounting, and Figure 9 is a plan view of the bottom of either rack.

Figure 10 is a top plan view of a modified form of rack.

Figure 11 is a detail sectional view showing an adjustment feature.

Referring more particularly to the drawings I have shown my device as comprising an outer tank or receptacle 10 which is cylindrical in shape and which may have any dimensions found advisable and which may also be constructed of any suitable material, such as galvanized iron, enamel ware or the like. At its upper edge this receptacle is formed or provided with handles 11 so that it may be easily carried about when necessary. The top of this receptacle is designed to be closed by a cylindrical member 12 which is formed with a bead 13 designed to engage at the upper edge of the receptacle 10 for preventing the top from slipping in. This top is formed centrally with a circular hole 14 for a purpose to be described.

In connection with this receptacle and top I provide a rack for plates, saucers and other flat dishes, this rack including a bottom 15 and a side wall 16 preferably perforated to permit free passage of water. The bottom 15 is provided with a plurality of upstanding pins or projections 17 for a purpose to be described. Extending transversely of the open top of this rack is a series of wires 18 which have one end connected with screws 19 adjustably mounted through the side and which have their other ends connected with coil springs 20 connected with the opposite side. By adusting the screws 19 the spring tension on the wires may be regulated. The plates to be washed are inserted between the successive wires 18 with their lowermost portions engaging certain of the pins or projections 17 which will operate to prevent the plates from sliding down or slipping about. This rack is provided with a bail 21 formed at its center with what may be called an open loop 22 with which is detachably engageable a hook 23 formed on the lower end of a rod 24 which terminates in a handle 25.

I also make use of a rack for holding deeper dishes and cups, this rack being of the same construction as that previously described, except that the wires 18 are located much farther apart so that there will be room between them for hooks 26 upon which cups may be hung.

In the use of the device plates, saucers and other shallow dishes are inserted between the wires 18 of the first described rack and this rack is disposed within the outer receptacle or tank 10. Water may first be placed within the tank or may be placed therein after the rack is in place and this water should preferably have a temperature of about 150° Fahrenheit as this temperature is found to be most advantageous for loosening grease without causing setting or hardening of any food fragments which might be adhering to the dishes. The top 12 is placed in position with the handle 24 extending through the hole 14 therein and with the hook 23 of the handle engaged with the loop 22. The operator then moves the handle up and down which causes the dishes to be agitated in contact with the hot water or soap suds so that a thorough cleansing action will be had. The deeper dishes such as those used for serving vegetables and the like are washed in the same manner but are of course placed in the other rack in which the wires 18 are farther apart and it will be noted that owing to the provision of the springs 20 in the racks differences in the depth of various dishes will be taken care of as the wires may yield. After washing as above described the top 12 is removed and the rack is pulled up somewhat, that is out of the water and fresh hot water is poured over the dishes to effect rinsing, after which the rack full of dishes is set on the tray 27 to drain. I have found that after a very short time the dishes will dry themselves, though if a gloss is desired it may be advisable to rub the dishes with the usual towel just before they become thoroughly dried.

In Figure 10 I have shown a slight modification of the rack structure designed particularly for use in the kitchens of small families especially where it is not desired to use separate racks as those above described for holding dishes of different types. In this form the cylinder 28 is provided at its top with a series of light coil springs 29 spaced apart as shown instead of the wires and springs previously described. This permits placing plates, saucers and also deep dishes in the same rack, it being also possible to force cups between the springs and engage them upon suitable hooks 26 on the inside of the cylinder.

From the foregoing description and a study of the drawings it will be apparent that I have thus provided a simply constructed and consequently inexpensive device for washing dishes with far less labor than is required in the ordinary hand washing method. It is to be noted that I have made ample provision for taking care of dishes of all kinds so that no handling will be required other than placing the dishes within the racks and subsequently removing them.

While I have shown and described the preferred embodiment of the invention it is of course to be understood that I reserve the right to make such changes in the form, construction and arrangement of parts as will not depart from the spirit of the invention or the scope of the subjoined claims.

I claim:

1. A dish rack comprising a rim member, a plurality of spaced parallel wires extending thereacross, coil springs connected at one end with the rim and at their other ends with said wires respectively, and means for adjusting the wires longitudinally for varying the tension of said springs.

2. A dish rack comprising a rim member, a plurality of spaced parallel wires extending thereacross, coil springs connected at one end with the rim and at their other ends with said wires respectively, and means for adjusting the wires longitudinally for varying the tension of said springs, said means comprising nipples rotatably engaged through holes in the rim and having threaded bores, the ends of the wires being threaded for engagement within said bores.

In testimony whereof I affix my signature.

WALTER B. PIERSON.